United States Patent [19]

Uchida

[11] Patent Number: 4,727,289
[45] Date of Patent: Feb. 23, 1988

[54] LED LAMP

[75] Inventor: Akio Uchida, Tokyo, Japan

[73] Assignee: Stanley Electric Co., Ltd., Tokyo, Japan

[21] Appl. No.: 887,374

[22] Filed: Jul. 17, 1986

[30] Foreign Application Priority Data

Jul. 22, 1985 [JP] Japan .............................. 60-112095[U]

[51] Int. Cl.[4] ............................................. H05B 41/00
[52] U.S. Cl. ........................................ 315/71; 315/53; 315/185 R; 315/312; 315/250; 313/498; 362/800
[58] Field of Search ................. 315/53, 51, 71, 185 R, 315/250, 291; 313/498, 499, 500, 512, 315; 362/800

[56] References Cited

U.S. PATENT DOCUMENTS

| 1,275,820 | 8/1918 | Wybaillie ............................ 315/71 |
| 4,211,955 | 7/1980 | Ray ..................................... 315/53 |
| 4,329,625 | 5/1982 | Nishizawa et al. ................ 315/158 |
| 4,630,183 | 12/1986 | Fujita ............................. 313/512 X |

Primary Examiner—Leo H. Boudreau
Assistant Examiner—Mark R. Powell
Attorney, Agent, or Firm—Frishauf, Holtz, Goodman & Woodward

[57] ABSTRACT

The present invention provides a light-emitting diode lamp having a printed circuit board which is arranged inside a glass bulb having a base at an end thereof, via a stem and stays. A plurality of light-emitting diodes are mounted on the printed circuit board, a current being supplied to the light-emitting diodes through a series resistor. The series resistor has an annular shape and is fitted around the stem, so that a conventional lower-voltage LED lamp can be upgraded to a 100-V LED lamp.

10 Claims, 6 Drawing Figures

LED LAMP

BACKGROUND OF THE INVENTION

1. Field of the Invention

The present invention relates to a high-voltage light-emitting diode lamp used as a general ornamental sign lamp, a neon sign lamp, and as an indoor illumination lamp.

2. Description of the Prior Art

Conventional light-emitting diode (LED) lamps use either a 12- or 14-V power source and cannot be connected directly to the general AC outlet power source (100 V). As shown in FIG. 6, a conventional LED lamp of this type has a base 2 attached to one end of a glass bulb 1. A printed circuit board 5 is mounted within the glass bulb 1 through a stem 3 and stays 4. A plurality of light-emitting diodes (LEDs) 6 are mounted on the printed circuit board 5. A current is supplied to the LEDs 6 through a series resistor 7. An inert gas such as $N_2$ gas is sealed in the glass bulb 1.

Since the LED lamp having the above arrangement uses either a 12- or 14-V power source, a low power series resistor 7 can be used and mounted within the glass bulb. However, when a 100-V power source is used, a large, high-power resistor is required, which is quite difficult to incorporate in the glass bulb. For example, when a series resistor is provided immediately under the printed circuit board, heat generated by the resistor degrades the characteristics of the LEDs. In addition, since a 100-V LED circuit is formed within a single glass bulb, the size, shape and number of the means for mounting the series resistor are restricted.

SUMMARY OF THE INVENTION

The present invention has been made in order to solve the problem that has arisen in the course of an attempt to upgrade the conventional low-voltage LED lamp to a 100-V LED lamp, wherein the characteristics of the LEDs are degraded by heat generated by the series resistor, and to solve the problem of the various restrictions in relation to mounting of the series resistor.

According to the present invention, as a practical means for solving the above problems, a lamp comprises a printed circuit board which is arranged inside a glass bulb having a base at an end thereof; a stem in said glass bulb; and means for mounting said printed circuit board to said stem. A plurality of LEDs are mounted on the printed circuit board. A current is supplied to the LEDs through aseries resistor. The series resistor has an annular shape and is fitted around the stem. Therefore, the LEDs mounted on the printed circuit board are not affected by the heat generated by the series resistor. In addition, since the series resistor has an annular shape, it has a high power handling capacity. Therefore, the resultant LED lamp can be used at a high voltage.

DETAILED DESCRIPTION OF THE INVENTION

Figure 1:
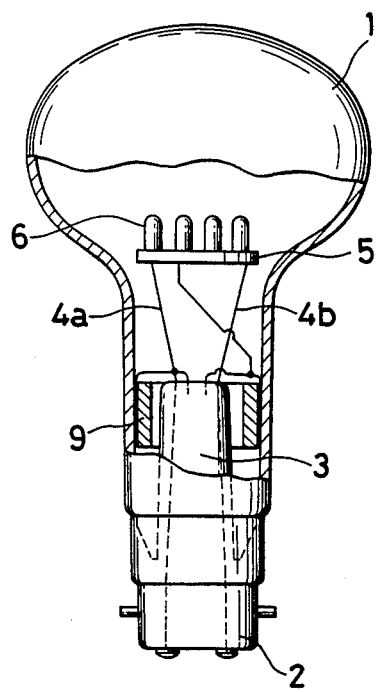
FIG. 1 is a partially sectional side view of an LED lamp according to the present invention.
Figure 6:
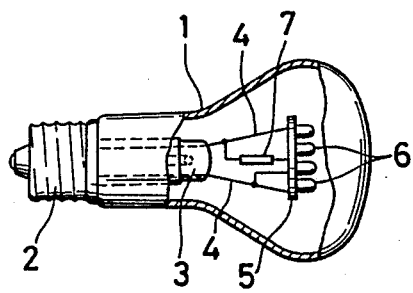
FIG. 6 is a partially sectional side view of a conventional LED lamp.

An illustrated embodiment of the present invention will be described in more detail with reference to the accompanying drawings. For the sake of convenience, the same reference numerals denote the same portions as in the conventional LED lamp of FIG. 6. In FIG. 1, a base 2 is mounted on one end of a glass bulb 1. A stem 3 is provided inside the glass bulb 1 on the base 2 side. A printed circuit board 5 is mounted to the stem 3 by means of a pair of stays 4a and 4b. A plurality of LEDs 6 are mounted on the printed circuit board 5. In this embodiment, the pair of stays 4a and 4b are connected to the base 2 for supplying a current to the stem 3, and serve only as mounting elements for the printed circuit board 5.

Figure 2:
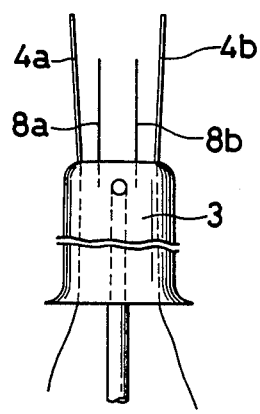
FIG. 2 is a schematic side view of a stem of the LED lamp.

More specifically, as shown in FIG. 2, the pair of stays 4a and 4b extend from the lower portion of the LEd lamp through the stem 3, and are connected to an external power line (not shown) through the base 2. In this case, the base 2 can be of a pin-terminal type of of a screw type. A pair of anchor wires 8a and 8b are mounted on the stem 3 to be adjacent to the stays 4a and 4b. The anchor wires 8a and 8b serve to stably fix a series resistor 9 (to be described later).

Figure 3:
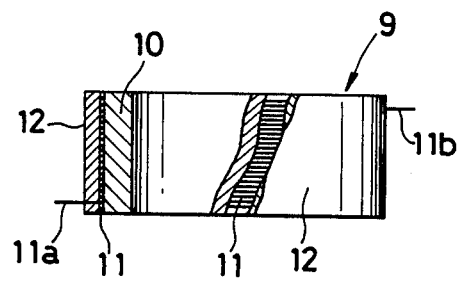
FIG. 3 is an enlarged partially sectional side view of a series resistor mounted and housed in the LED lamp.

The series resistor 9 has an annular shape. As shown in FIG. 3, the series resistor 9 is formed by winding a resistor wire 11 around a cylindrical bobbin 10, forming an enamel layer 12 on the resistor wire 11, and sintering the resultant product. The resistor wire 11 can be a copper wire having two twisted ends. Alternatively, a plurality of resistor wires 11 can be twisted and can be connected to the enamel layer 12 as external lead wires 11a and 11b.

Figure 4:
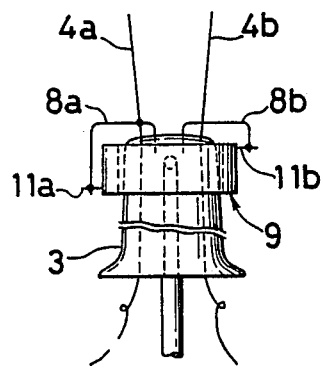
FIG. 4 is a schematic side view of a state wherein the series resistor is mounted to the stem.
Figure 5:
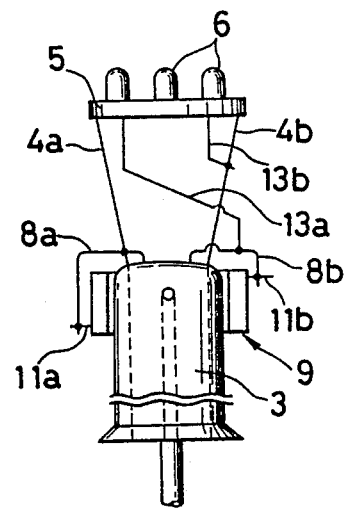
FIG. 5 is a schematic side view of a state wherein a printed circuit board is mounted on the stem.

The series resistor 9 having the above arrangement is fitted around the stem 3, as shown in FIG. 4. The anchor wires 8a and 8b are bent outward to prevent its removal from the stem 3. The anchor wires 8a and 8b are stably connected to the external lead wires 11a and 11b, respectively, of resistor 9 by spot welding. After the series resistor 9 is mounted on the stem 3 in this manner, the printed circuit board 5 is mounted on the stays 4a and 4b as shown in FIG. 5. In this case, the stays 4a and 4b only support the printed circuit board 5, and electrical contact between the stays 4a and 4b and the printed circuit board 5 is obtained by spot-welding the anchor wire 8a, which is connected to the external lead wire 11a, to the stay 4a. A lead wire 13a is spot-welded to the anchor wire 8b connected to the external lead wire 11b of resistor 9, and is connected to one terminal of the printed circuit board 5. Another lead wire 13b, which is spot-welded to the stay 4b, is connected to the other terminal of the printed circuit board 5, thereby forming a series electrical path through the series resistor 9. Since the annular series resistor 9 is formed by winding the resistor wire 11 around a cylindrical bobbin 10, it can have a resistance of about 2.5 to 3.5 kΩ and a power of 7 to 10 W, resulting in a large, high-power resistor.

In this manner, the stem 3 having the annular series resistor 9 mounted thereon can be inserted and mounted within the glass bulb 1, and the base 2 is mounted thereon. Subsequently, the interior of the glass bulb 1 is substituted with an inert gas such as $N_2$ gas, thereby completing an LED lamp.

As described above, according to the present invention, the series resistor connected inside the LED lamp has an annular shape, so that it can have a large size and a large power handling capacity. Thus, even if a 100-V AC outlet power source is used, sufficient resistance and capacitance can be obtained, so that the LED lamp of the present invention can be used as various illumination lamps and as general ornamental sign lamps.

Since the annular series resistor is mounted in the glass bulb while it is fitted around the stem, it is not limited in mounting space. In addition, the series resistor can be mounted to have a good anti-vibration property, while the heat generated thereby does not adversely affect the LEDs mounted on the printed circuit board.

What is claimed is:

1. In a high voltage light-emitting diode lamp, comprising:
    a glass bulb having a base at an end thereof;
    a stem extending from said base in said glass bulb;
    a printed circuit board arranged inside said glass bult;
    means in said glass bulb for mounting said printed circuit board to said stem;
    a plurality of light-emitting diodes mounted on said printed circuit board; and
    a series resistor in said glass bulb and electrically connected in series with said light-emitting diodes;
    the improvement wherein said series resistor has an annular shape and comprises a resistance wire wound around a cylindrical bobbin and having a coating layer on said wound resistance wire, and said series resistor being fitted around said stem with said cylindrical bobbin extending around said stem, said cylindrical bobbin being interposed between said stem and said resistance wire wound around said bobbin.

2. The light-emitting diode lamp of clamp 1, wherein said resistance wire comprises at least one strand.

3. The light-emitting diode lamp of claim 1, wherein said coating layer comprises an enamel layer.

4. The light-emitting diode lamp of claim 1, further comprising anchor means for coupling said annular series resistor to said stem.

5. The light-emitting diode lamp of claim 4, wherein said anchor means comprises electrical conducting means.

6. The light-emitting diode lamp of claim 5, wherien said means for mounting said printed circuit board to said stem comprises a pair of stays.

7. The light-emitting diode lamp of claim 6, wherein said stays comprise elongated electrical conductors.

8. The light-emitting diode lamp of claim 7, wherein said anchor means is electrically connected to one of said elongated electrically conducting stays.

9. The light-emitting diode lamp of claim 1, wherein said means for mounting said printed circuit board to said stem comprises a pair of stays.

10. The light-emitting diode lamp of claim 9, wherein said stays comprise elongated electrical conductors.

* * * * *